(12) United States Patent
Yamamoto

(10) Patent No.: US 12,474,447 B2
(45) Date of Patent: Nov. 18, 2025

(54) LiDAR APPARATUS

(71) Applicant: DENSO CORPORATION, Kariya (JP)

(72) Inventor: Masahiro Yamamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 973 days.

(21) Appl. No.: 17/646,561

(22) Filed: Dec. 30, 2021

(65) Prior Publication Data

US 2022/0120865 A1   Apr. 21, 2022

Related U.S. Application Data

(63) Continuation of application No. PCT/JP2020/025889, filed on Jul. 1, 2020.

(30) Foreign Application Priority Data

Jul. 3, 2019   (JP) .................................. 2019-124512

(51) Int. Cl.
  *G01S 7/481*   (2006.01)
  *G01S 17/931*   (2020.01)

(52) U.S. Cl.
  CPC .......... *G01S 7/4813* (2013.01); *G01S 7/4817* (2013.01); *G01S 17/931* (2020.01)

(58) Field of Classification Search
  None
  See application file for complete search history.

(56) References Cited

U.S. PATENT DOCUMENTS

| | | | | |
|---|---|---|---|---|
| 2006/0152705 A1* | 7/2006 | Yoshida | ................. | G01S 7/4813 356/28 |
| 2007/0086084 A1* | 4/2007 | Mori | ...................... | G08B 13/04 359/362 |
| 2014/0320845 A1 | 10/2014 | Bayha et al. | | |
| 2019/0146070 A1* | 5/2019 | Hansson | ................. | G01S 17/32 356/5.09 |

* cited by examiner

*Primary Examiner* — Elizabeth M Kerr
(74) *Attorney, Agent, or Firm* — Maschoff Brennan

(57) ABSTRACT

A LiDAR apparatus includes a light transmitter, an optical window, and a heating wire. The light transmitter emits and sweeps light in a predetermined scanning direction. The optical window is disposed in an opening of a housing in which the light transmitter is installed and permits light beams, as outputted from the light transmitter, to pass therethrough. The heating wire works to supply heat to the optical window. The heating wire has at least one section which is located at equal intervals away from and extends parallel to two of a plurality of beam center lines which are arranged adjacent each other. Each of the beam center lines is a line extending in the scanning direction through centers of a plurality of beam transmitting regions of the optical window through which the light beams pass.

4 Claims, 5 Drawing Sheets

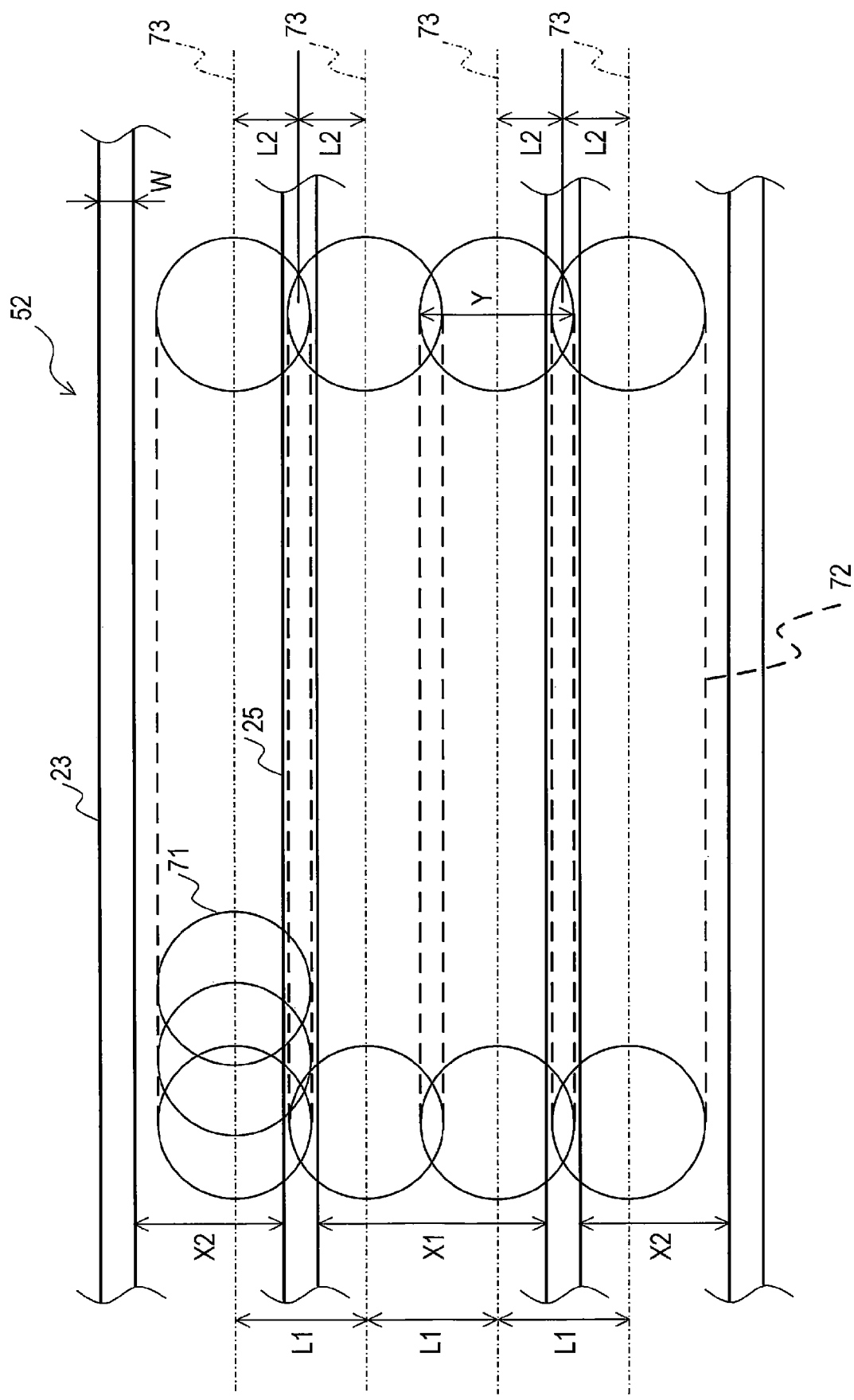

LiDAR APPARATUS

CROSS REFERENCE TO RELATED DOCUMENT

The present application claims the benefit of priority of Japanese Patent Application No. 2019-124512 filed on Jul. 3, 2019, the disclosure of which is incorporated in its entirely herein by reference.

TECHNICAL FIELD

This disclosure generally relates to a LiDAR apparatus equipped with an optical window.

BACKGROUND ART

LiDAR apparatuses are known which emit light and receive reflected light to calculate a distance to an object. LiDAR stands for Light Detection and Ranging. Such a type of LiDAR apparatus is usually equipped with a housing and an optical window which is disposed in a portion of the housing through which light, as emitted from inside to outside the housing, passes or light, as admitted from outside to inside the housing, passes.

Patent Literature 1 teaches use of a heater working to apply heat to the optical window in order to remove drops of water, snow, or dirt adhered to the optical window. The heater uses a heating conductor which is arranged outside an area of a radiation window which is made of a portion of the optical window and admits emitted light to pass therethrough in order to alleviate adverse effects of the heater on the emitted light.

PRIOR ART DOCUMENT

Patent Literature

PATENT LITERATURE 1 Japanese Translation of PCT International Application Publication No. 2015-506459

SUMMARY OF THE INVENTION

The inventor of this application has reviewed and found that the prior art techniques, as taught in Patent Literature 1, have the following problem.

Specifically, effects of heating by the heater conductor will usually decrease with distance from a portion of the optical window on which the heating conductor is arranged. The above prior art structure, as described already, has the heating conductor around the radiation window without occupying the radiation window. The closer to the center of the radiation window, therefore, the lesser a temperature rise thereof will be. This results in insufficient heating of the optical window.

An object of this disclosure is to provide techniques for ensuring efficiency in heating an optical window and reducing adverse effects of a heating conductor on emitted light.

One aspect of this disclosure is to provide a LiDAR apparatus which comprises a light transmitter, an optical window, and a heating wire. The light transmitter is configured to emit and sweep light beams in a scanning direction. The optical window is disposed in an opening of a housing in which the light transmitter is disposed and permits the light beams, as emitted from the light transmitter, to pass therethrough. The heating wire is configured to supply heat to the optical window. The heating wire is configured to have at least one section which is located at equal intervals away from and extends parallel to two of a plurality of beam center lines which are arranged adjacent each other. Each of the beam center lines is a line extending in the scanning direction through centers of a plurality of beam transmitting regions of the optical window through which the light beams pass.

The above arrangements serve to enhance efficiency in heating the optical window and reduce adverse effects of the heating wire on emitted light.

BRIEF DESCRIPTION OF THE DRAWINGS

FIG. 5 is a partial schematic view of a heater which demonstrates a relation between a heating conductor and an emitted light beam.

MODE FOR CARRYING OUT THE INVENTION

An embodiment in this disclosure will be described below with reference to the drawings.

1 Structure

Figure 1:
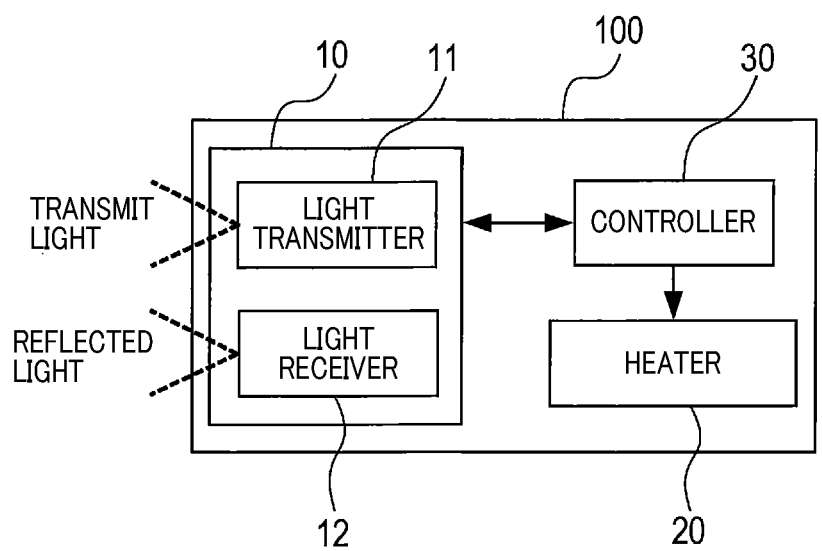
FIG. 1 is a block diagram which illustrates a structure of a LiDAR apparatus.

The LiDAR apparatus 100 in FIG. 1 is a ranging device working to emit light and receive reflected light that is a return of the emitted light from an object to calculate a distance to the object. The LiDAR apparatus 100 is mounted in a vehicle in use to detect various types of objects present ahead of the vehicle.

The LiDAR apparatus 100 includes the measuring device 10, the heater 20, and the controller 30.

The measuring device 10 includes the light transmitter 11 and the light receiver 12. The light transmitter 11 works to intermittently emit light. The light receiver 12 works to receive reflected light that is a return of the emitted light. The light transmitter 11 outputs light in the form of a laser beam. The light receiver 12 receives light reflected from an object and converts it into an electrical signal.

Figure 2:
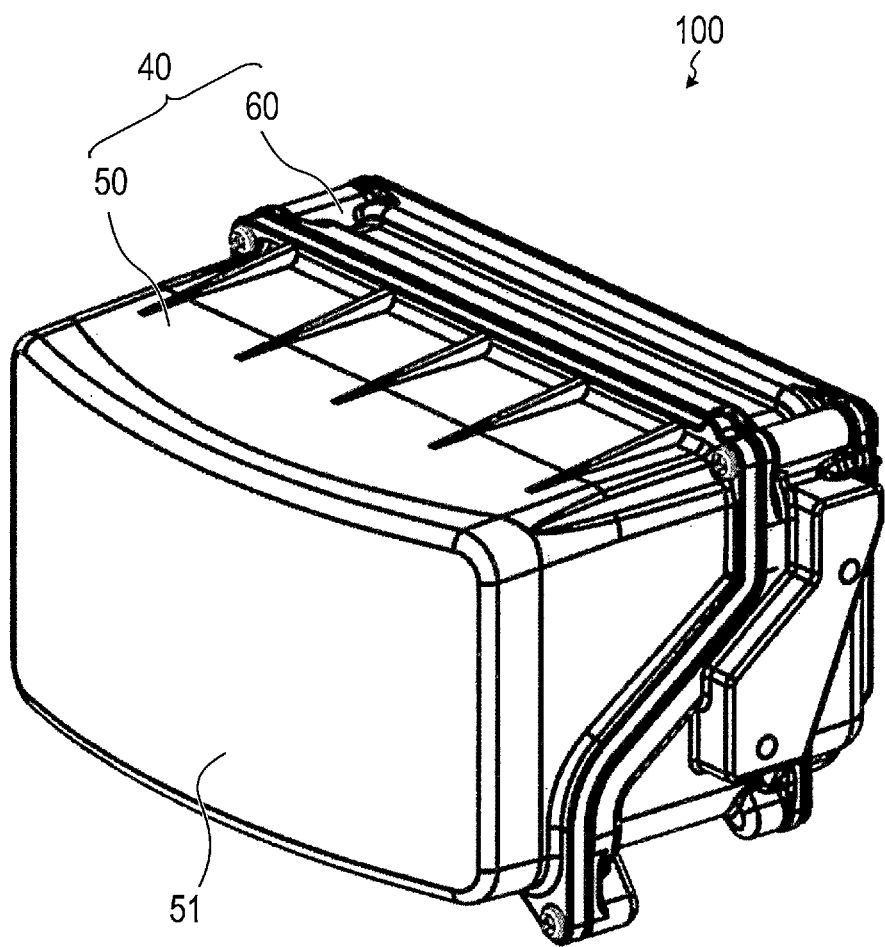
FIG. 2 is a perspective view which illustrates an appearance of a LiDAR apparatus.

The measuring device 10 is disposed inside the housing 40 which, as illustrated in FIG. 2, includes the cover 50 and the housing body 60. The housing 40 has an inner space which is located close to the optical window 51 and divided into an upper region and a lower region. The light transmitter 11 is disposed in the upper region of the inner space of the housing 40, while the light receiver 12 is disposed in the lower region of the inner space of the housing 40.

Figure 3:
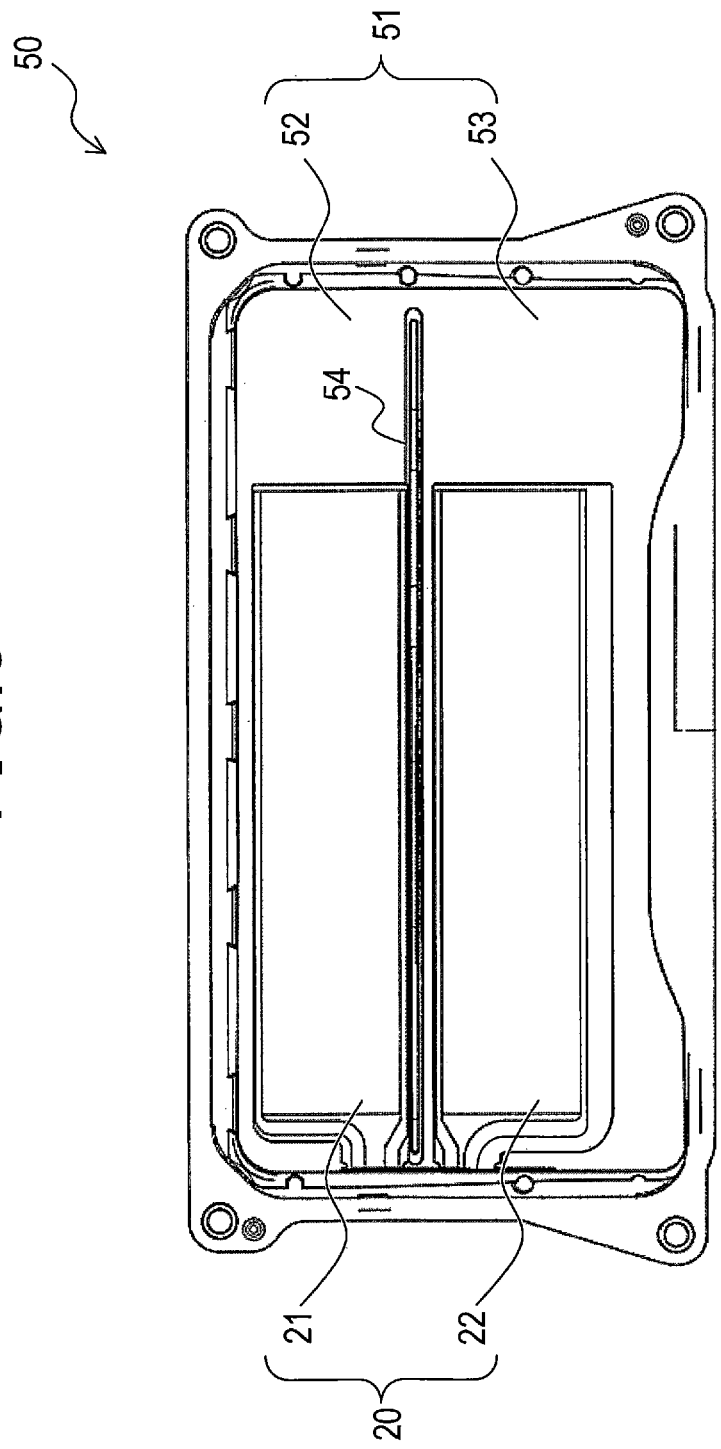
FIG. 3 is an illustration of a cover of a LiDAR apparatus, as viewed from inside the cover.

The cover 50 has disposed in a front face thereof the optical window 51 which is transparent to admit light to pass therethrough. The front face, as referred to herein, represents a portion of an outer surface of the LiDAR apparatus 100 from which light is outputted. The optical window 51 has disposed on an inner surface thereof the shielding plate 54 which, as illustrated in FIG. 3, isolates between the light transmitter 11 and the light receiver 12 to block leakage of light from the light transmitter 11 to the light receiver 12 or vice versa. In the following discussion, a portion of the optical window 51 which is located above the shielding plate 54 (i.e., close to the light transmitter 11) will also be referred to as the light emitting window 52, while a portion of the optical window 51 which is located below the shielding plate 54 (i.e., close to the light receiver 12) will also be referred to as the light receiving window 53.

The heater 20 is disposed on an inner surface of the optical window 51 and activated with supply of electricity to heat the optical window 51. The heater 20 includes the light emitting window heater 21 and the light receiving window heater 22.

The controller 30 illustrated in FIG. 1 works to measure a distance between itself and an object irradiated with light using the measuring device 10. Specifically, the controller 30 analyzes the waveform of an electrical signal outputted from the light receiver 12 to determine a time when the reflected light was received and calculates the distance to the object as a function of a difference between the time when the light was emitted and the time when the reflected light was received. The controller 30 is also capable of obtaining information about, for example, an azimuth of the object in addition to the distance to the object.

The controller 30 also works to control energization of the heater 20 in addition to the distance measurement. The optical window 51 is heated by the heater 20 to reduce a risk of adhesion of snow or fog to the optical window 51.

2 Light Transmitter

The light transmitter 11 is equipped with a light source which emits light in the form of a pulse and a deflecting mirror which is rotated by an electrical motor. The light transmitter 11 serves to reflect light, as emitted from the light source, on the deflecting mirror to direct the light in a direction set by an angular position of the deflecting mirror, thereby scanning a predetermined range with the light. In this embodiment, the light transmitter 11 emits and moves a scanning light beam horizontally. The light transmitter 11 also moves the scanning light beam horizontally at a plurality of heights. In this embodiment, the light transmitter 11 is designed to emit a light beam whose cross section is in the shape of true circle.

3 Heater

Figure 4:
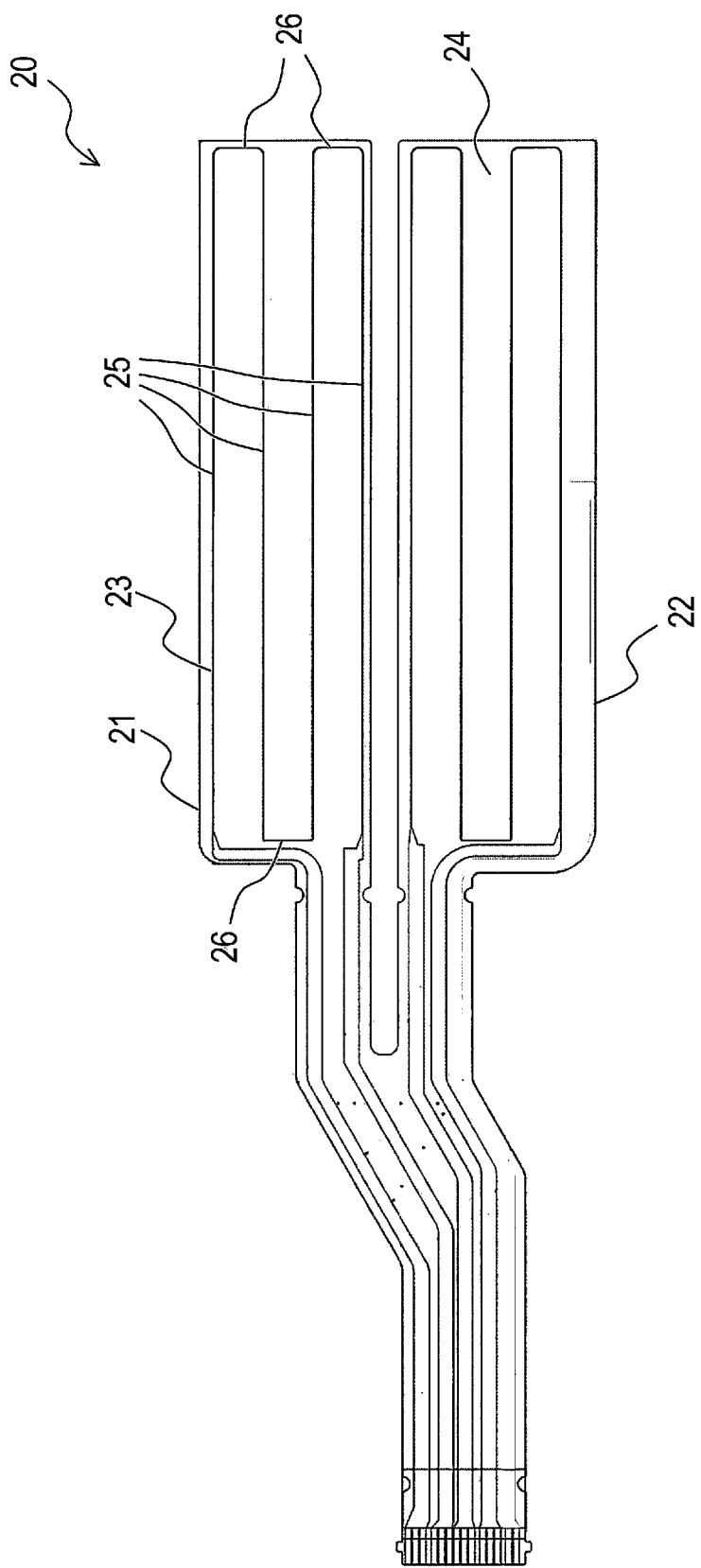
FIG. 4 is a wiring diagram of a heating conductor.

The heater 20 is, as can be seen in FIG. 4, made of a film heater including the base film 24 and the heating wire 23 arranged in a meandering shape on the base film 24. The heating wire 23 is made by attaching copper foil to the transparent base film 24 and then etching it into the shape of a heating circuit. The attachment of the heater 20 to the inner surface of the optical window 51 is achieved using optical adhesion tape. The light emitting window heater 21 is arranged to cover at least an area of the light emitting window 52 through which the transmit light will pass. The light receiving window heater 22 covers at least an area of the light receiving window 53 through which the reflected light will pass.

The meandering heating wire 23 includes a plurality of long sections 25 and a plurality of short sections 26 shorter in length than the long sections 25. Ends of each of the long sections 25 are connected by a respective one of the short sections 26. Each of the long sections 25 extends parallel to each other in a scan direction. Each of the long sections 25, as can be seen in FIG. 5, has a constant width W. FIG. 5 is a partially enlarged view of the light emitting window heater 21 illustrated in FIG. 4.

Light beams emitted from the light transmitter 11, as demonstrated in FIG. 5, pass through predetermined portions of the light emitting window 52. Specifically, light beams, as outputted in the form of pulses, are swept in the scanning direction. The beam transmitting regions 71 of the light emitting window 52 through which the light beams pass are, therefore, true-circular. The sweeping of the beams causes the beam transmitting regions 71 to be arrayed in the shape of lines extending in the scanning direction. In the following discussion, a strip-shaped line extending between two of the beam transmitting regions 71 of the light emitting window 52 which are located at opposite ends of each array will also be referred to as the beam line 72. Every adjacent two of the beam transmitting regions 71 on each beam line 72 are laid to partly overlap each other.

The light emitting window 52 is configured to have the beam lines 72 arranged adjacent each other in a sub-scanning direction perpendicular to the scanning direction. In other words, the light transmitter 11 is designed to emit or sweep light to array beam center lines 73 that are longitudinal center lines of the beam lines 72 and arranged at given equal intervals L1 away from each other in the light emitting window 52. Each of the beam center lines 73 is a line extending in the scanning direction through the centers of the beam transmitting regions 71 arrayed along a corresponding one of the beam lines 72. The interval L1 is shorter than a dimension (i.e., the diameter Y) of each of the beam transmitting regions 71 in the sub-scanning direction. In other words, a respective adjacent two of the beam lines 72 are laid to partially overlap each other. In this embodiment, the light emitting window 52 is configured to have four beam lines 72.

It is advisable in terms of reducing adverse effects on beams passing through the light emitting window 52 that the heating wire 23 disposed on the light emitting window 52 be located not to optically block or interrupt the beams. The further away from the heating wire 23, the less the effects of heat supply by the heating wire 23. It is, therefore, advisable in terms of effectiveness of heating the light emitting window 52 that the heating wore 23 also occupy the central area of the light emitting window 52.

To the above end in this embodiment, the heating wire 23 is arranged to reduce the adverse effects on the beams based on the locations of the beam lines 72 on the light emitting window 52. In this embodiment, the four long sections 25 are disposed on the light emitting window 52. The outermost two of the four long sections 25 which are located away from each other in the sub-scanning direction are arranged not to overlap the beam transmitting regions 71 on the light emitting window 52. The remaining two of the four long sections 25 which are close to each other in the sub-scanning direction are arranged away from each other at the same interval as that between two of the beam center lines 73 disposed adjacent each other over those two long sections 25 and extend parallel to the two of the beam center lines 73. In other words, the interval L2 between the center line of each of the above two inner long sections 25 and an adjacent one of the beam center lines 73 located outside a corresponding one of the two inner long sections 25 is selected to be half the interval L1. The inner long sections 25 are, therefore, laid to block or cover an adjacent inner two of the beam lines 72 on the same conditions.

The heating wire 23 on the light emitting window 52 is arranged to have the wire intervals X1 and X2 which are larger than or equal to a dimension of each of the beam transmitting regions 71 in the sub-scanning direction. Each of the wire intervals X1 and X2 is an interval between an adjacent two of the long sections 25. Each of the wire intervals X1 and X2 is equal to a value derived by subtracting the width W of each of the long sections 25 from an interval (i.e., pitch) between the longitudinal center lines of an adjacent two of the long sections 25. In other words, the heating wire 23 is arranged not to have a plurality of discrete portions overlapping a respective one of the beam transmitting regions 71.

In this embodiment, the heating wire 23 is also arranged on the light receiving window 53 in the same form as on the light emitting window 52.

4 Beneficial Advantages

The above embodiment offers the following beneficial advantages.

4a) The heating wire 23 is also disposed on the central area of the light emitting window 52, thereby facilitating the ease with which the central area of the light emitting window 52 becomes warm. Particularly, the heating wire 23 is configured to have a portion which covers an adjacent two of the beam lines 72 under the same conditions, thereby minimizing a variation in intensity of the beams. The structure of the heating wire 23 is, therefore, capable of effectively supplying heat to the optical window 51 and adverse effects of the heating wire 23 on light emitted to the optical window 51.

4b) The light beam emitted by the light transmitter 11 usually an intensity increasing toward the center thereof. In this embodiment, a portion of the light beam far away from the center thereof is blocked or covered with the heating wire 23, thus reducing the adverse effects of the heating wire 23 on the light beam as compared with a case where the central area of the light beam is blocked by the heating wire 23.

4c) Portions of the heating wire 23 which are laid to overlap the beam transmitting regions 71 are located at the same intervals away from two of the beam center lines 73 disposed adjacent each other across the portions of the heating wire 23. Such portions of the heating wire 23 are also arrayed parallel to the beam center lines 73. In other words, portions of all the light beams which are blocked by the heating wire 23 are arranged at equal intervals away from the centers of the light beams, so that substantially the same adverse effects of the heating wire 23 are exerted on all the light beams, thereby minimizing a variation in intensity of the light beams.

4d) The heating wire 23 is laid to overlap all the beam transmitting regions 71 under the same conditions, so that substantially the same adverse effects of the heating wire 23 are exerted on all light beams passing through the light emitting window 52. This minimizes a variation in intensity of the light beam.

4e) Overlapping of a plurality of portions of the heating wire 23 on a light beam emitted from the light transmitter 11 will facilitate deflection of the light beam from the effect of the heating wire 23. In this embodiment, the wiring spacings X/and X2 of the long sections 25 are selected to be larger than the dimension Y of the beam transmitting regions 71. This results in no overlap of a plurality of portions of the heating wire 23 on the light beam, thereby reducing the adverse effects of the heating wire 23 on the light beam.

OTHER EMBODIMENTS

While an embodiment has been described above, this disclosure is not limited to it, it should be appreciated that this disclosure can be embodied in various ways.

5a) In the above embodiment, the heating wire 23 is laid to overlap all the beam transmitting regions 71 on the light emitting window 52 on the same conditions, but however, one or some of the beam transmitting regions 71 may be arranged not to be covered with the heating wire 23.

5b) In the above embodiment, portions of the heating wire 23 which overlap the beam transmitting regions 71 are all located at a constant interval away from the beam center lines 73, but however, at least one of the above portions may alternatively be arranged at another interval away from the beam center lines 73. For instance, only one of inner two of the long sections 25 which are located inside the outermost two of the long sections 25 in the sub-scanning direction may be located at equal intervals away from and extend parallel to two of the beam center lines 73 which are arranged adjacent each other across that long section 25. This arrangement also minimizes a variation in intensity of light beams blocked at least by the above long sections 25.

5c) The above embodiment has referred to the four long sections 25 provided for the four beam lines 72, but however, the number of the beam lines 72 or the number of the long sections 25 is not limited to four, but rather may be optional.

5d) In the above embodiment, the heating wire 23 on the light receiving window 53 is arranged in the same form as that on the light emitting window 52, but however, it may alternatively be arrayed in a form different from that on the light emitting window 52.

5e) In the above embodiment, the heater 20 is disposed on the inner surface of the optical window 51, but however, it may alternatively be arranged on the outer surface of the optical window 51.

5f) In the above embodiment, the light beam emitted by the light transmitter 11 is true-circular in transverse cross section thereof, but however, may alternatively be of another shape, e.g., square or elliptic.

5g) The functions to be executed by one of the structural units in the above embodiment may be shared with another of the structural units. Alternatively, the functions in some of the structural units may be implemented by one of the structural units. One or some of the structural units in each of the embodiments may be omitted or added to another embodiment.

5h) This disclosure may be realized in various modes, such as systems equipped with the LiDAR apparatus 100 in addition to the LiDAR apparatus 100 itself.

What is claimed is:

1. A LiDAR apparatus comprising:
a light transmitter which emits and sweeps light beams in a scanning direction;
an optical window which is disposed in an opening of a housing in which the light transmitter is disposed and permits the light beams, as emitted from the light transmitter, to pass therethrough; and
a heating wire which is configured to supply heat to the optical window,
wherein
the heating wire has at least one section that is located at equal intervals away from two of a plurality of beam center lines, and the at least one section extends parallel to the two of a the plurality of beam center lines which are arranged adjacent each other, and
each of the plurality of beam center lines is a line extending in the scanning direction through centers of a plurality of beam transmitting regions of the optical window through which the light beams pass.

2. The LiDAR apparatus as set forth in claim 1, wherein
the light transmitter is configured to emit the light beams with respect to the plurality of beam center lines, which are arranged at a given interval away from each other on the optical window,
the given interval is shorter than a dimension of each of the beam transmitting regions in a direction perpendicular to the scanning direction, and
the heating wire has portions, which are laid to overlap the beam transmitting regions, the heating wire is arranged at equal intervals away from the two of the plurality of beam center lines disposed adjacent each other across the portions, and the heating wire is arrayed parallel to the two of the plurality of beam center lines.

3. The LiDAR apparatus as set forth in claim 1, wherein the heating wire is laid to overlap the beam transmitting regions of the optical window.

4. The LiDAR apparatus as set forth in claim 1, wherein an interval between two portions of the heating wire, which are arranged adjacent each other in a direction perpendicular to the scanning direction, is longer than or equal to a dimension of each of the beam transmitting regions in the direction perpendicular to the scanning direction.

* * * * *